(12) United States Patent
Luce

(10) Patent No.: US 10,464,663 B2
(45) Date of Patent: Nov. 5, 2019

(54) REMOTE HYDRAULIC UTILITY SYSTEM FOR AN AIRCRAFT

(71) Applicant: Goodrich Corporation, Charlotte, NC (US)

(72) Inventor: William E. Luce, Colleyville, TX (US)

(73) Assignee: Goodrich Corporation, Charlotte, NC (US)

( * ) Notice: Subject to any disclaimer, the term of this patent is extended or adjusted under 35 U.S.C. 154(b) by 436 days.

(21) Appl. No.: 15/232,516

(22) Filed: Aug. 9, 2016

(65) Prior Publication Data
US 2018/0043998 A1 Feb. 15, 2018

(51) Int. Cl.
| | | |
|---|---|---|
| B64C 25/22 | (2006.01) | |
| B64C 25/34 | (2006.01) | |
| B64C 25/50 | (2006.01) | |
| F15B 1/26 | (2006.01) | |

(52) U.S. Cl.
CPC .............. *B64C 25/22* (2013.01); *B64C 25/34* (2013.01); *B64C 25/50* (2013.01); *F15B 1/265* (2013.01); *F15B 2201/51* (2013.01); *F15B 2211/20515* (2013.01); *F15B 2211/20538* (2013.01); *F15B 2211/212* (2013.01); *F15B 2211/6651* (2013.01); *F15B 2211/6653* (2013.01)

(58) Field of Classification Search
CPC ......... B64C 25/22; B64C 25/34; B64C 25/50; F15B 1/265
See application file for complete search history.

(56) References Cited

U.S. PATENT DOCUMENTS

| | | | |
|---|---|---|---|
| 4,735,380 | A | 4/1988 | Barousse et al. |
| 5,253,982 | A | 10/1993 | Niemiec et al. |
| 8,038,094 | B2 | 10/2011 | Oyama |
| 2009/0152394 | A1 | 6/2009 | Frank et al. |

FOREIGN PATENT DOCUMENTS

| | | | |
|---|---|---|---|
| EP | 2570344 A2 | | 3/2013 |
| EP | 2816237 A1 | | 12/2014 |
| FR | 2827346 | * | 1/2003 |
| FR | 2827346 A1 | | 1/2003 |
| GB | 519542 | | 3/1940 |
| GB | 540183 A | | 10/1941 |

OTHER PUBLICATIONS

Extended European Search Report dated Dec. 11, 2017 in European Application No. 17184350.1.
European Patent Office, European Search Report dated May 21, 2019 in Application No. 17184350.1.

* cited by examiner

*Primary Examiner* — Justin M Benedik
(74) *Attorney, Agent, or Firm* — Snell & Wilmer, L.L.P.

(57) ABSTRACT

A remote hydraulic system for an aircraft may provide hydraulic fluid to nose landing gear while being isolated from the main landing gear and other main hydraulic systems of the aircraft. A supply pressure accumulator may be configured to supply hydraulic fluid to a hydraulic load of the nose gear. A pressure sensor may be configured to detect a hydraulic pressure in the supply pressure accumulator. A pump may be in fluid communication with the supply pressure accumulator and configured to switch on in response to the hydraulic pressure below a threshold value. A return pressure accumulator may be configured to store the hydraulic fluid returning from the hydraulic load. The pump may drive fluid from the return pressure accumulator to the supply pressure accumulator.

16 Claims, 3 Drawing Sheets

REMOTE HYDRAULIC UTILITY SYSTEM FOR AN AIRCRAFT

FIELD

The disclosure relates generally to remote hydraulic systems for hydraulic components located near the nose of an aircraft.

BACKGROUND

Aircraft often contain numerous hydraulic systems including, for example, utility systems typically used for the landing gear systems. The hydraulic pumps for utility systems are typically located aft of the nose region. Transporting pressurized hydraulic fluid from the aft portions of the aircraft to the nose region often involves long networks of hydraulic tubes. The tubes run from near the engines, where the pump pressurizes fluid using engine power, to the nose of the aircraft, where the pressurized fluid is used to power and steer the nose landing gear.

As a result of the long tubing networks, the aircraft carries a large volume of hydraulic fluid to fill hydraulic tubes used for both supply and return. Carrying extra fluid equates to carrying extra weight and thereby decreasing aircraft efficiency. A larger hydraulic pump powers the main hydraulic system than would be used if the main hydraulic system were not powering the nose gear. The larger pump also increases aircraft weight. The tube runs are also installed, blead, and leak tested during the aircraft build process. Additionally, the tubes occasionally develop leaks over the life of the aircraft. Leaks in the tubing are fixed using labor intensive processes to locate the leak, access the tubing, and replace the tubing.

SUMMARY

A remote hydraulic system for an aircraft is provided. The remote hydraulic system may provide hydraulic fluid to nose landing gear while being isolated from the main landing gear and other main hydraulic systems of the aircraft. A supply pressure accumulator may be configured to supply hydraulic fluid to a hydraulic load of the nose gear. A pressure sensor may be configured to detect hydraulic pressure in the supply pressure accumulator. A pump may be in fluid communication with the supply pressure accumulator and configured to switch on in response to the hydraulic pressure below a threshold value. A return pressure accumulator may be configured to store the hydraulic fluid returning from the hydraulic load. The pump may drive fluid from the return pressure accumulator to the supply pressure accumulator.

In various embodiments, a valve may be in fluid communication with the pump and the supply pressure accumulator. The valve may prevent backflow of the hydraulic fluid. A pressure release valve may also be in fluid communication with the return pressure accumulator and the supply pressure accumulator to selectively permit hydraulic fluid to flow from the supply pressure accumulator to the return pressure accumulator. The pump may be a unidirectional pump and/or a uniform volume pump. The hydraulic load may be a hydraulic actuator configured for steering the nose gear, deploying the nose gear and associated doors, retracting the nose gear and associated doors, and/or locking the position of the nose gear and associated doors.

A hydraulic system for an aircraft may also include a supply pressure accumulator. The supply pressure accumulator may be configured to supply hydraulic fluid to the hydraulic components of the nose landing gear. A return pressure accumulator may be configured to store the hydraulic fluid returning from the components. A pump may be in fluid communication with the supply pressure accumulator and the return pressure accumulator to drive fluid from the return pressure accumulator to the supply pressure accumulator. A switch may activate the pump motor in response to a pressure of the supply pressure accumulator being below a start pressure threshold. The switch may also deactivate the motor of the pump in response to the supply pressure accumulator being above a stop pressure threshold.

In various embodiments, the supply pressure accumulator may be hydraulically isolated from a main landing gear. The supply pressure accumulator may also be configured to supply hydraulic fluid for steering, deploying the nose landing gear and associated doors, and/or retracting the nose landing gear and associated doors. A valve may be in fluid communication with the pump and the supply pressure accumulator to prevent backflow of the hydraulic fluid. A pressure release valve may be configured to selectively permit hydraulic fluid to flow from the supply pressure accumulator to the return pressure accumulator. The pump may be a unidirectional pump and/or a uniform volume pump. The hydraulic components may include at least one hydraulic actuator.

An aircraft is also provided. The aircraft may include a nose landing gear and a main landing gear coupled to the aircraft. A hydraulic system may be in fluid communication with the nose landing gear and configured to drive at least one of steering, deploying, or retracting of the nose landing gear and associated doors. The hydraulic system may also be hydraulically isolated from the main landing gear.

In various embodiments, the hydraulic system of the aircraft may include a supply pressure accumulator and a pump to charge the supply pressure accumulator in response to the pressure being below a threshold value. The hydraulic system may also include a return pressure accumulator configured to receive the hydraulic fluid returning from the nose landing gear. A pressure switch may be configured to activate a motor of the pump in response to the pressure in the supply pressure accumulator being below the threshold value. The hydraulic system may also include a check valve configured to restrict the backflow of the hydraulic fluid towards the pump.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

A self-contained hydraulic system located remotely from a main hydraulic system may power a typical nose landing gear system is comprised of actuators to translate various moving components. Nose landing gear system may have actuators to retract and extend the landing gear structures, actuators to retract and extend the associated doors, actuators that provide a downlock and release of landing gear structure, actuators that provide uplock and release for landing gear structure, actuators that provide uplock and release of associated doors, actuators to provide steering, and an assortment of valves to control and sequence the steering and actuation. The hydraulic system may include a supply pressure accumulator (SPA) and a return pressure accumulator (RPA). Pressure from the SPA may be used to move an actuator or numerous actuators that comprise a nose landing gear system. The SPA pressure bleeds down as fluid is used to drive hydraulic components. The fluid on the return side is driven into the RPA, where pressure builds as fluid is supplied. In response to the pressure in the SPA dropping below a predetermined value, a pump may begin to transfer fluid from the RPA to the SPA.

The pump may be sized to make adequate fluid transfer in time to support a realistic worst case scenario for aborted landings, emergency landings and/or "touch-and-go" followed by retraction and re-extension for second landing. The pump is thus sized to re-energize in a reasonable period of time for normal operations. The peak power demand of the smaller pump may thus be smaller than that of a conventional system. The pump may shut off, and not draw power, in response to the hydraulic system maintaining sufficient SPA pressure, such as while in-flight or while parked.

Figure 1:
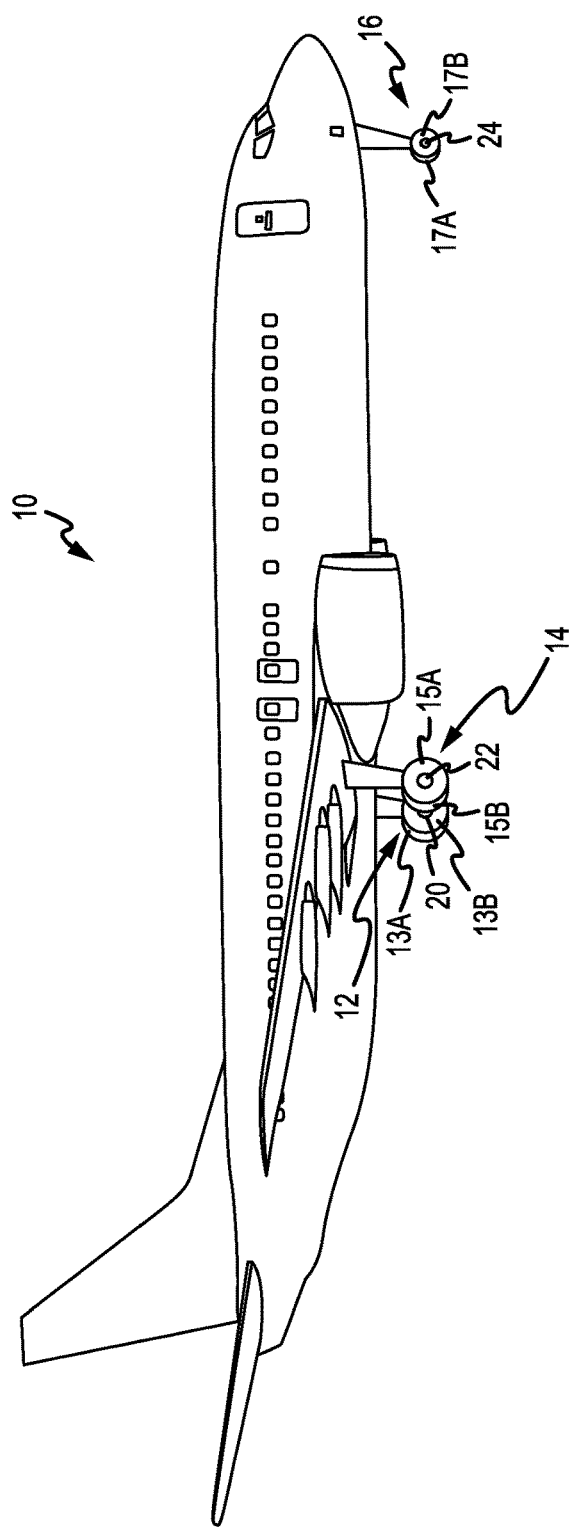
FIG. 1 illustrates an exemplary aircraft on the ground and supported by deployed landing gear, in accordance with various embodiments.

Referring now to FIG. 1, an aircraft 10 in accordance with various embodiments may include landing gear such as main landing gear 12, main landing gear 14 and nose landing gear 16. Main landing gear 12, main landing gear 14, and nose landing gear 16 may generally support aircraft 10 when aircraft is not flying, allowing aircraft 10 to taxi, take off and land without damage. Main landing gear 12 may include wheel 13A and wheel 13B coupled by an axle 20. Main landing gear 14 may include wheel 15A and wheel 15B coupled by an axle 22. Nose gear 16 may include nose wheel 17A and nose wheel 17B coupled by an axle 24.

In various embodiments, main landing gear 12, main landing gear 14, and nose gear 16 may each be retracted for flight. Hydraulic systems may be used to deploy and retract the landing gear system. Hydraulic systems may also be used to steer nose gear 16 to provide directional control during taxi. Main landing gear 12 and main landing gear 14 may use a hydraulic system located aft of nose gear 16. Nose gear 16 may use for its hydraulic systems a separate hydraulic circuit from the main landing gear 14.

Figure 2:
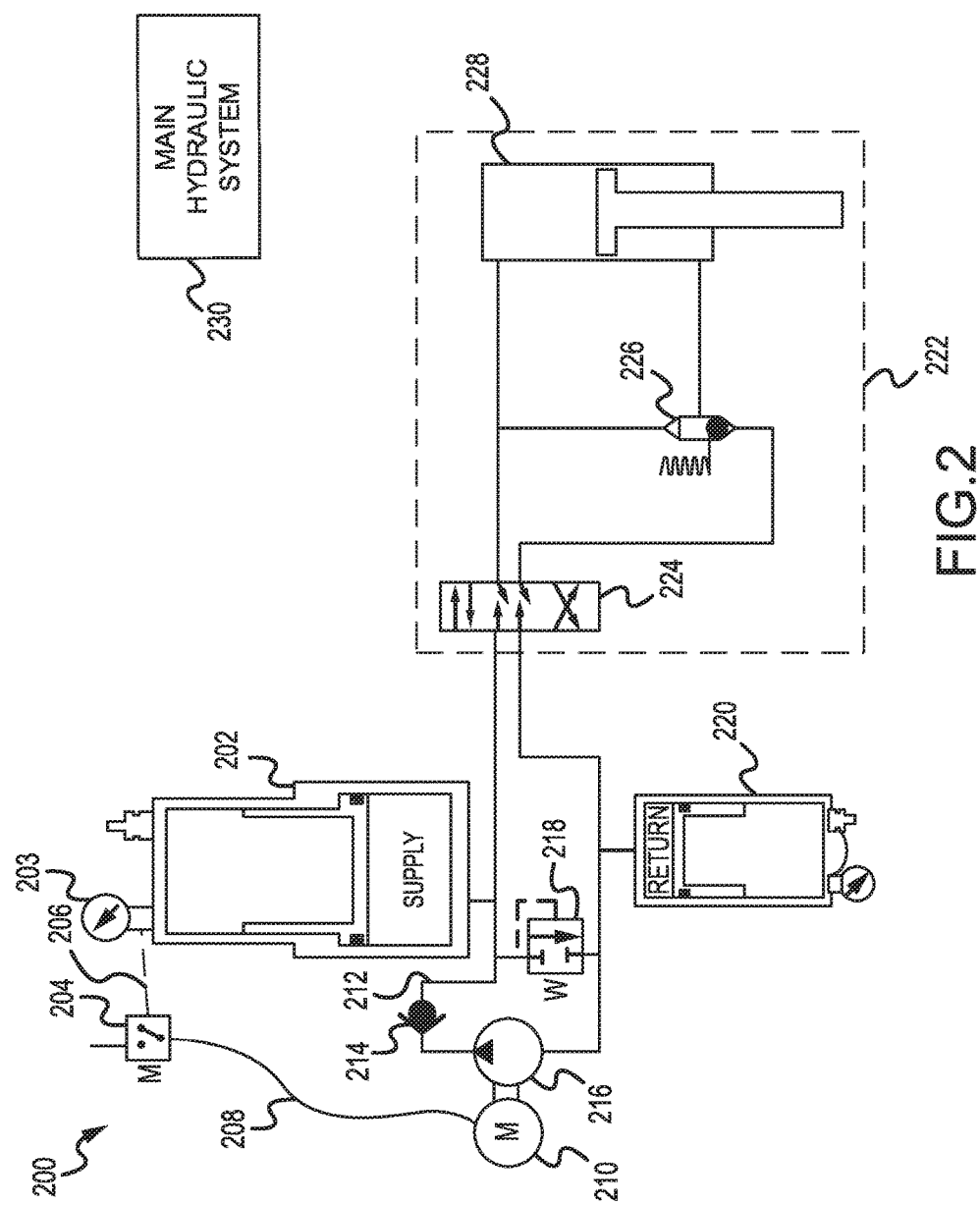
FIG. 2 illustrates an exemplary nose hydraulic system configured to power hydraulic systems independent from the main hydraulic systems of an aircraft, in accordance with various embodiments.

Referring now to FIG. 2, an exemplary hydraulic system 200 is shown, in accordance with various embodiments. Hydraulic system 200 may be in fluid communication with hydraulic components of nose gear 16 of FIG. 1 and may be isolated from the separate and distinct hydraulic systems that power main landing gear 12 and main landing gear 14. Hydraulic system 200 may include a supply pressure accumulator 202 (SPA). SPA 202 may be a hydraulic accumulator configured to supply pressurized hydraulic fluid to hydraulic load 222. Hydraulic load 222 may be a landing gear system comprising of multiple actuators, and multiple valves all working simultaneous or sequenced. A pressure sensor 203 is coupled to SPA 202 and configured to measure the pressure in SPA 202. A pressure switch 204 may be in electronic communication with pressure sensor 203. Pressure switch 204 may be in electronic communication with motor 210 of pump 216. Pressure switch 204 may also me in electronic communication with pressure sensor 203 over by way of an electrical conduit 206.

In various embodiments, pressure switch 204 may turn on motor 210 of pump 216 in response to the pressure stored in SPA 202 dropping below a predetermined start threshold. Thus, motor 210 may drive pump 216 to move hydraulic fluid from return pressure accumulator 220 (RPA) into SPA 202 and thereby increase the pressure in SPA 202. Pump 216 may be a unidirectional hydraulic pump. Pump 216 may also be a fixed displacement, or uniform volume, hydraulic pump. Pump 216 may have a capacity selected based on the worst-case regeneration scenario. Pump 216 may thus have capacity selected based on the maximum estimated pressure depletion rate in SPA 202 over the time of the depletion, where the capacity is selected to maintain SPA 202 pressure above a minimum safe operational pressure level.

In various embodiments, the hydraulic components of hydraulic system 200 may be in fluid communication via a conduit 212 such as, for example, hydraulic tubing. In that regard, pump 216 may urge hydraulic fluid through conduit 212 from RPA 220 to SPA 202. A check valve 214 or other type of valve may restrict the backflow of hydraulic fluid from SPA 202 to pump 216 and/or RPA 220. Pressure switch 204 may turn off motor 210 in response to the pressure in SPA 202 reaching a predetermined shutoff threshold.

In various embodiments, a pressure release valve 218 may be in fluid communication with SPA 202 and RPA 220. Pressure release valve 218 may be configured to release fluid from SPA 202 into RPA 220 in response to pressure on the SPA 202 side of the hydraulic circuit exceeding a threshold value. For example, a temperature change in the hydraulic system may cause the pressure to fluctuate, the volume of fluid on SPA 202 side to increase, and thereby cause pressure release valve 218 to selectively permit fluid to pass from SPA 202 side to RPA 220 side of the hydraulic circuit.

In various embodiments, hydraulic system 200 may provide pressurized fluid to hydraulic load 222. Hydraulic load 222 of a nose gear hydraulic system may comprise various hydraulic actuators 228 for steering, deploying nose gear 16 of FIG. 1, retracting nose gear 16, up locks, down locks, or other hydraulic devices located remotely from and hydraulically isolated from the main hydraulic system of an aircraft. Hydraulic load 222 may also include various valves 224 and hydraulic components 226 to control the flow of hydraulic fluid throughout the hydraulic load 222. A main hydraulic system 230 configured to drive main gear 12 and main gear 14 may be hydraulically isolated from hydraulic system 200.

Figure 3:
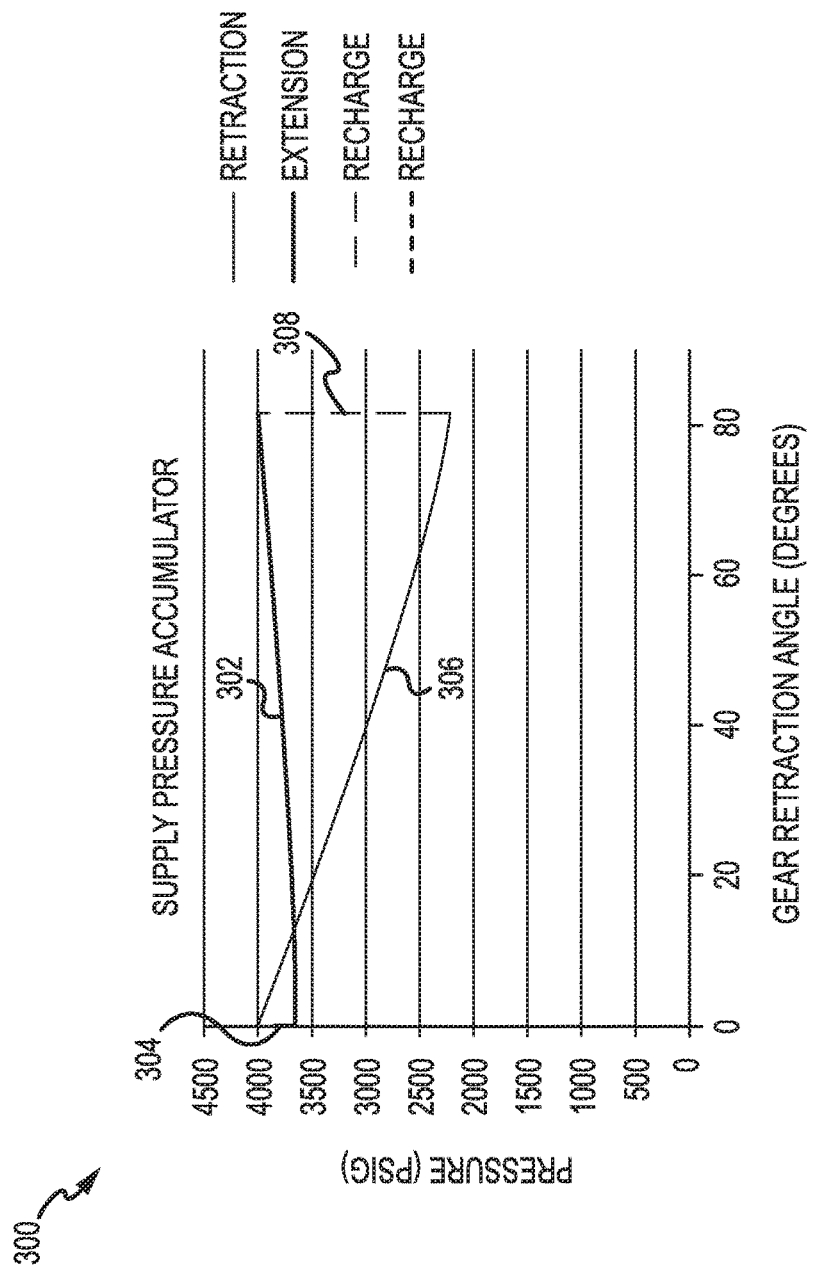
FIG. 3 illustrates an exemplary graph of the pressure in a supply pressure accumulator during extension and retraction of landing gear, in accordance with various embodiments.

With reference to FIG. 3, an exemplary pressure graph 300 is shown of the fluid pressure present in SPA 202 of FIG. 2 against the angle of nose gear 16 of FIG. 1 during landing gear extension and retraction, in accordance with various embodiments. The above-mentioned threshold value to start pump 216 and stop pump 216 may be set at 4,000 psi (27,579 kPa), for example, as illustrated in pressure graph 300. Although the start threshold and stop threshold are the same in the system of FIG. 3, the start and stop thresholds may be set independently to any desired value. The pressure thresholds and hydraulic volume of SPA 202 and RPA 220 may be set based on the hydraulic demands of hydraulic load 222. Other suitable pressure thresholds may be, for example, 3500 psi (24,131 kPa), 4500 psi (31,026 kPa), 5000 psi (34,473 kPa), or any suitable pressure value to support load demands. The pressure thresholds described herein may vary by +/−5%, +1-10%, or +/−15%, for example.

In various embodiments, the pressure present in SPA 202 drops as landing gear actuators use hydraulic pressure from SPA 202 to translate nose gear 16 from 0 degrees (in a deployed position) to 80 degrees (a stowed for flight position). Although the drop may not be linear relative to gear angle in practice, edge 306 illustrates the pressure drop versus angle as a linear relationship. Edge 308 illustrates a recharge period wherein pump 216 of FIG. 2 is moving hydraulic fluid from RPA 220 to SPA 202, as described above. Edge 302 illustrates deployment/extension of nose gear 16. During deployment/extension, edge 302 drops in response to actuators using fluid to move the landing gear through the angles. Pump 216 may again recharge SPA 202 during the recharge period denoted by edge 304.

The hydraulic systems disclosed herein may tend to reduce the weight of an aircraft by enabling the main hydraulic system to use a smaller hydraulic pump and reducing the length of hydraulic conduit installed in an aircraft. The pressure accumulators may recharge over time, allowing a relatively small pump to supply adequate pressure to nose gear systems including steering, retraction, deployment, locking, and any other hydraulic system related to or near the nose landing gear.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A remote hydraulic system for an aircraft, comprising:
   a supply pressure accumulator configured to supply hydraulic fluid to a hydraulic load;
   a pressure sensor configured to detect a hydraulic pressure in the supply pressure accumulator;
   a pump in fluid communication with the supply pressure accumulator, wherein the pump is configured to switch on in response to the pressure sensor detecting the hydraulic pressure below a threshold value; and
   a return pressure accumulator configured to store the hydraulic fluid returning from the hydraulic load, wherein the pump is configured to drive fluid from the return pressure accumulator to the supply pressure accumulator;
   wherein the hydraulic system is in fluid communication with a hydraulic component of a nose landing gear of the aircraft;
   wherein the hydraulic load comprises a hydraulic actuator configured for at least one of steering, deploying the nose landing gear, retracting the nose landing gear, locking the nose landing gear in position, deploying a nose landing gear door, retracting the nose landing gear door, or locking the nose landing gear door;
   wherein the supply pressure accumulator is hydraulically isolated from a hydraulic system used to operate a main landing gear of the aircraft.

2. The remote hydraulic system of claim 1, further comprising a check valve in fluid communication with the pump and the supply pressure accumulator, wherein the check valve is configured to prevent backflow of the hydraulic fluid.

3. The remote hydraulic system of claim 1, further comprising a pressure release valve in fluid communication with the return pressure accumulator and the supply pressure accumulator, wherein the pressure release valve is configured to selectively permit the hydraulic fluid to flow from the supply pressure accumulator to the return pressure accumulator.

4. The remote hydraulic system of claim 1, wherein the pump comprises a unidirectional pump.

5. The remote hydraulic system of claim 1, wherein the pump is a uniform volume pump.

6. A hydraulic system in fluid communication with hydraulic components of a nose landing gear, comprising:
   a supply pressure accumulator configured to supply hydraulic fluid to the hydraulic components of the nose landing gear;
   a return pressure accumulator configured to store the hydraulic fluid returning from the hydraulic components of the nose landing gear;
   a pump in fluid communication with the supply pressure accumulator and the return pressure accumulator, wherein the pump is configured to drive fluid from the return pressure accumulator to the supply pressure accumulator; and
   a switch configured to activate a motor of the pump in response to a pressure of the supply pressure accumulator being below a start pressure threshold, wherein the switch is configured to deactivate the motor of the pump in response to the supply pressure accumulator being above a stop pressure threshold;
   wherein the supply pressure accumulator is configured to supply the hydraulic fluid for at least one of steering, deploying the nose landing gear, retracting the nose landing gear, locking the nose landing gear in position, deploying a nose landing gear door, retracting the nose landing gear door, or locking the nose landing gear door;
   wherein the supply pressure accumulator is hydraulically isolated from a hydraulic system used to operate a main landing gear.

7. The hydraulic system of claim 6, further comprising a valve in fluid communication with the pump and the supply pressure accumulator, wherein the valve is configured to prevent backflow of the hydraulic fluid.

8. The hydraulic system of claim 6, further comprising a pressure release valve in fluid communication with the return pressure accumulator and the supply pressure accumulator, wherein the pressure release valve is configured to selectively permit the hydraulic fluid to flow from the supply pressure accumulator to the return pressure accumulator.

9. The hydraulic system of claim 6, wherein the pump comprises a unidirectional pump.

10. The hydraulic system of claim 6, wherein the pump is a uniform volume pump.

11. The hydraulic system of claim 6, wherein the hydraulic components comprise at least one of a hydraulic actuator.

12. An aircraft, comprising:
   a nose landing gear coupled to the aircraft;
   a main landing gear coupled to the aircraft; and
   a hydraulic system in fluid communication with the nose landing gear and configured to drive at least one of steering the nose landing gear, deploying the nose landing gear, retracting the nose landing gear, locking the nose landing gear in position, translating a nose landing gear door, or locking the nose landing gear door in position,
   wherein the hydraulic system is hydraulically isolated from the main landing gear.

13. The aircraft of claim 12, wherein the hydraulic system comprises:
   a supply pressure accumulator configured to supply hydraulic fluid to the nose landing gear; and
   a pump configured to charge the supply pressure accumulator in response to a pressure in the supply pressure accumulator being below a threshold value.

14. The aircraft of claim 13, wherein the hydraulic system comprises a return pressure accumulator configured to receive the hydraulic fluid returning from a hydraulic component of the nose landing gear.

15. The aircraft of claim 13, wherein the hydraulic system further comprises a pressure switch configured to activate a motor of the pump in response to the pressure in the supply pressure accumulator being below the threshold value.

16. The aircraft of claim 13, wherein the aircraft comprises a main hydraulic system configured to drive the main landing gear, wherein the main hydraulic system is hydraulically isolated from the hydraulic system.

* * * * *